United States Patent [19]

Mecklenborg et al.

[11] 3,790,256

[45] Feb. 5, 1974

[54] ROLL AND FOCUS APPARATUS

[75] Inventors: Richard A. Mecklenborg, Binghamton; Richard E. McClenahan, Johnson City, both of N.Y.

[73] Assignee: The Singer Company, Binghamton, N.Y.

[22] Filed: Dec. 13, 1971

[21] Appl. No.: 207,035

[52] U.S. Cl. .............................. 350/287, 350/102
[51] Int. Cl. ............................................. G02b 7/18
[58] Field of Search ..................... 350/6, 7, 22–24, 350/26, 285, 286, 287, 102, 103

[56] References Cited
UNITED STATES PATENTS

| | | | |
|---|---|---|---|
| 2,873,381 | 2/1959 | Lauroesch | 350/7 |
| 3,170,982 | 2/1965 | Hemstreet et al. | 350/102 |

*Primary Examiner*—David Schonberg
*Assistant Examiner*—Michael J. Tokar
*Attorney, Agent, or Firm*—John C. Altmiller; James C. Kesterson

[57] ABSTRACT

A silvered right-angle prism and a corner cube prism are combined to form an optical device capable of introducing image roll, a change in path length for focusing and optical axis offset. Incident rays are reflected by one side of the right angle prism to the corner cube prism where after three internal reflections they exit to reflect off the other side of the right angle prism. By controlling the distance between the two prisms path length is changed. Movement of the prisms with respect to each other in the other two translational degrees shifts the optical axis and rotation of the combined prisms will result in image roll.

9 Claims, 8 Drawing Figures

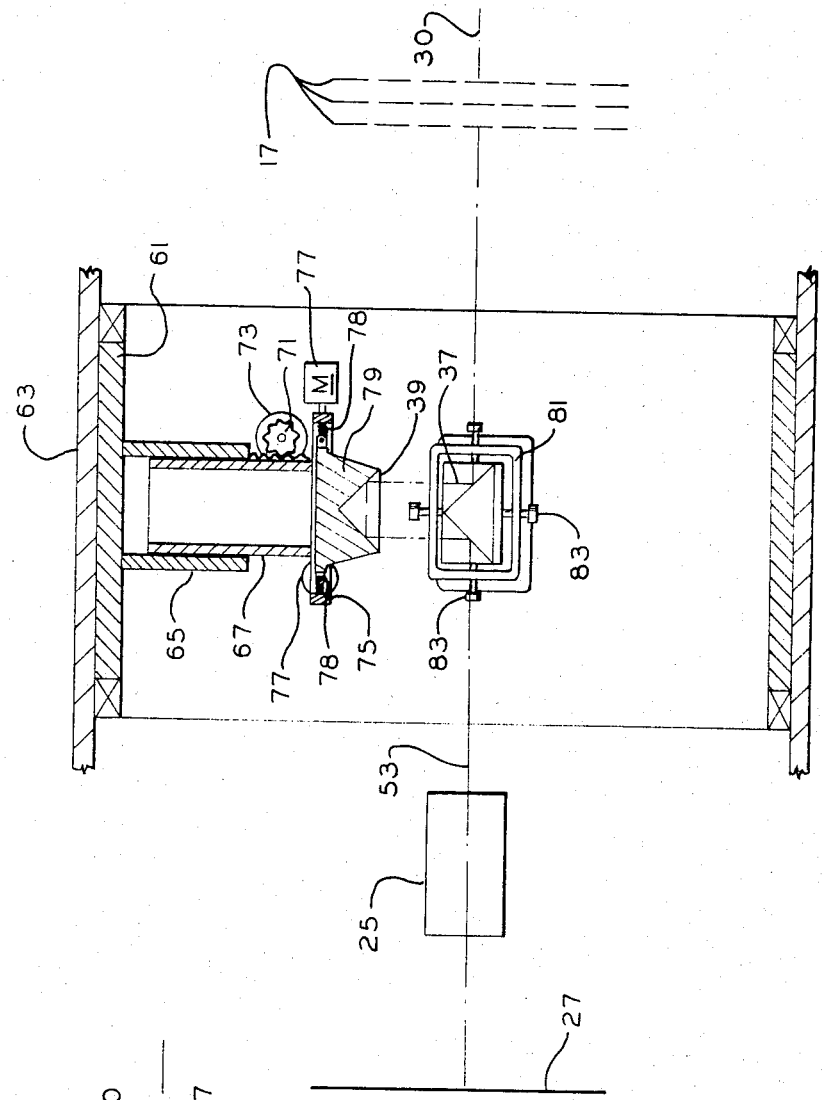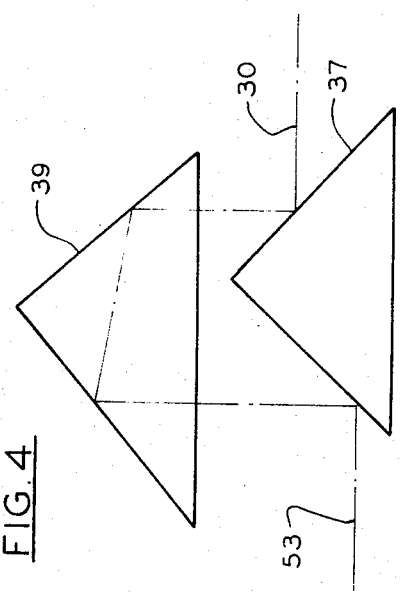

ROLL AND FOCUS APPARATUS

The invention relates to optical apparatus in general and more particularly to a combination of optical elements which may be used for conjugate compensation, shifting of an optical axis and rolling an image about the optical axis.

In various types of optical system an image must be rolled, the optical path length changed and the optical axis shifted. One such system is a probe of the type used to generate an image of a model for display to the pilot of a simulator. In prior art systems the devices used to obtain these types oF transformations were generally very sensitive to changes in alignment of the elements involved and thus required complex holding and alignment means. In addition separate devices were generally used to obtain the different kinds of motion. The device of the present invention is sensitive only in a relatively small number of possible degrees of freedom making it easy to mount. In addition it provides all the required types of motion described above.

It is the principal object of this invention to provide an improved device for changing the length of an optical path.

Another object is to provide such a device which may also be used to introduce image roll.

A further object is to provide such a device which may also be used to shift the optical axis in the system in which it is used.

Another object is to provide such a device using a right anlge prism and a corner cube prism.

It is also an object to provide such a device which is easy to mount and align.

An additional object is to provide a device useful in simulator camera model system probe.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects oF the invention reference should be had to the following detailed description taken in connection with the accompanying drawings in which:

FIG. 4 is an elevation view of the device of the present invention showing the shifting of the optical axis;

FIG. 5 is a crossectional view of a preferred mounting of the device in an optical probe.

Figure 1:
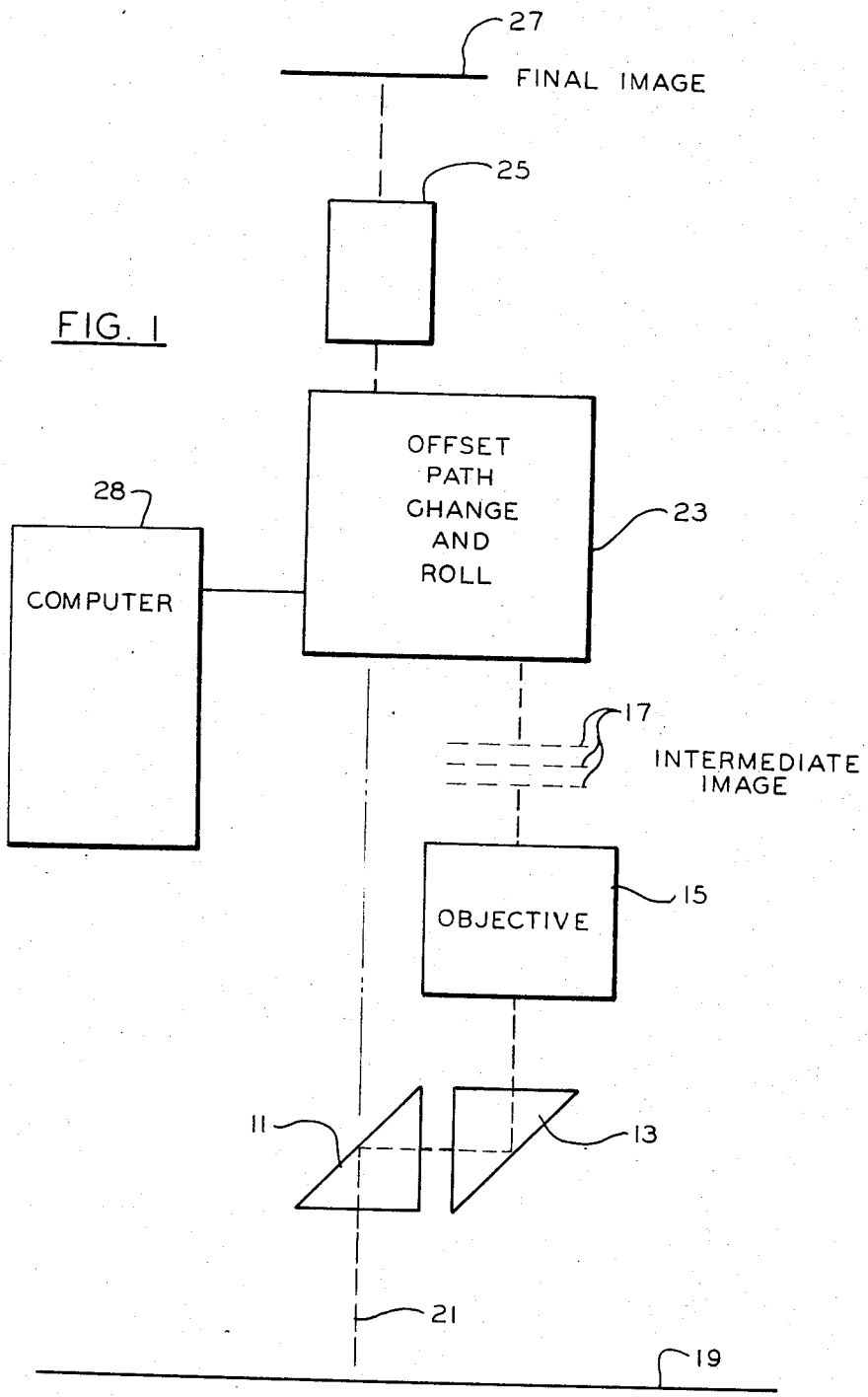
FIG. 1 is a block diagram of a typical camera-model system probe in which the device of the present invention may be used.

FIG. 1 illustrates the basic elements needed in a probe of the type used in camera model systems to generate an image to be viewed by a pilot in a simulator of trainer. Two prisms 11 and 13 are provided at the input to the probe to obtain the degree of image motion corresponding to the pitch of the aircraft. An objective lens 15 focuses the image at an intermediate image plane 17. Since the distance from the model 19, which is the object, may vary, image plane 17 may not always fall at the same place. This variance is indicated by the three sets of dotted lines 17. Since roll and yaw of the trainer must be introduced in addition to pitch provided by prisms 11 and 13 means must be provided for simulation of yaw and roll. Yaw motion is normally obtained by rotating the whole optical package about axis 21. But, if a path offset to restore the shift caused by prisms 11 and 13 is provided, only the elements prior to the offset need be rotated for yaw. This is signficant where the image input is to a TV camera for example. The camera may remain fixed making drive requirements less difficult and costly. Thus a block 23 has been shown which will shift the optical axis back in line with axis 21, roll the image (to simulate vehicle roll and compensate for roll introduced when yawing) and change the path length through the block so that the distance from a relay lens 25 to image plane 17 may be held constant as the location of image plane is changed resulting in the final image plane 27 always being at the same place. A computer 28 is shown providing input commands to block 23 to control the position of the optical elements which are servo driven as will be described below. The prism 11 and the package comprising prisms 11 and 13, objective 15, and block 23 will also be driven by servos responding to computer commands in a manner well known in the art.

For example computer 28 may be a flight computer in a simulator. As simulated altitude increases and the probe is moved up by means not shown it would provide a command to change path length to compensate for the change in distance between the image 19 and objective lens 15. In similar manner, as the simulated aircraft rolls, a roll command with proper offset commands included, as will be explained below, may be provided.

Figure 2:
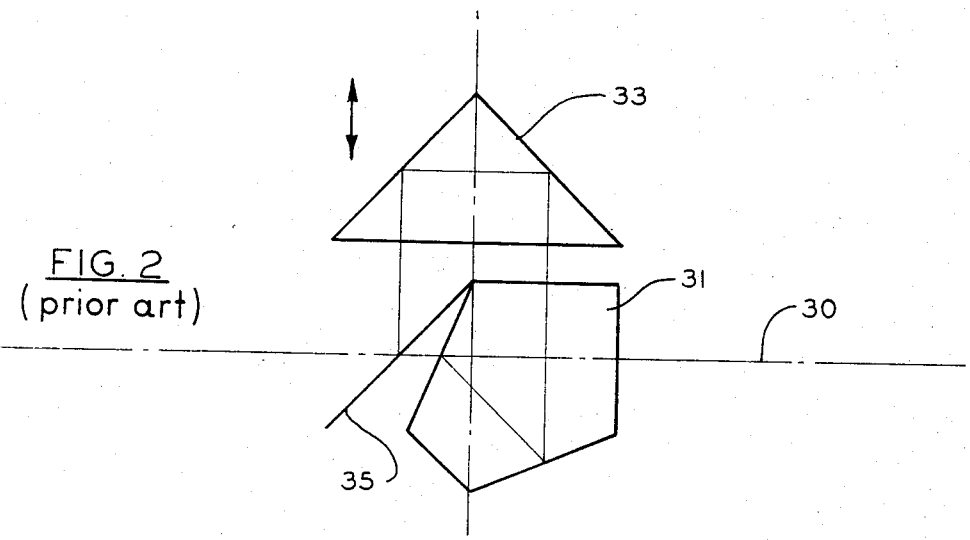
FIG. 2 is an elevation view of a prior art device which the device of the present invention replaces.

FIG. 2 shows one type of prior art device used to change internal path length and obtain image roll. The image input axis 30 intersects a penta prism 31. After two internal reflection rays exit from the prism to a porro prism 33 where they are reflected twice more and then to a mirror 35 which reflects them back along the optical axis. By adjusting the distance from prism 31 to prism 33 an internal path length change is obtained. By rotation of the entire device about axis 30 image roll is effected since the device has an odd number of reflections, i.e., five. In addition further mirrors or prisms are needed to displace the optical axis to meet the offset requirement discussed above. The holding and alignment devices needed for this device are very complex. For example the mirror 35 requires adjustment along the optical axis as well as two rotational adjustments.

Figure 3A:
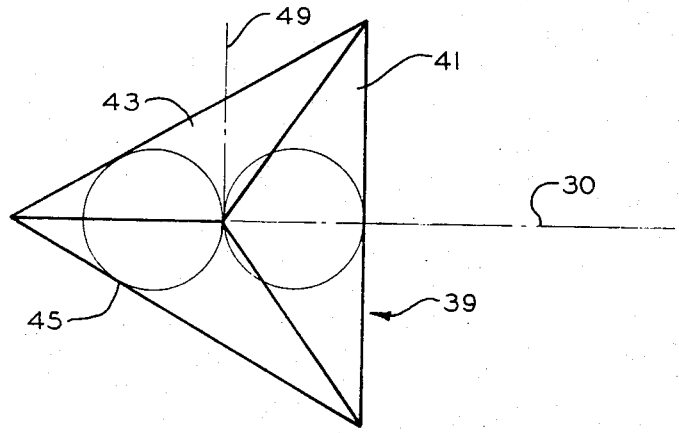
FIG. 3a is a plan view of device of the present invention.
Figure 3B:
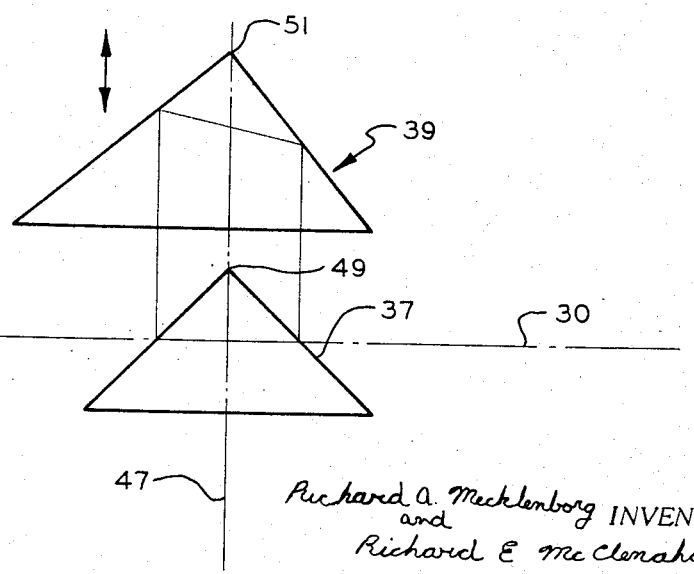
FIG. 3b is an elevation view of the device of the present invention.

FIG. 3a and b show respectively a plan and elevation view of the basic elements of the device of the present invention. The input on axis 30 si reflected by the silvered side oF a right angle prism 37 to a corner cube prism 39 and will be internally reflected by face 41 to face 43, (or 45) thence to face 45 (or 43) from which face it exits the prism to be reflected back to the optical axis 30 by a second silvered side of prism 37. As in the prior art device motion of prism 39 with respect to prism 37 will change path length and rotation of the total device will introduce roll, since again there is an odd number (five) of reflections.

However, the corner cube prism 39 is retro-directive, that is an incident ray and exit ray will always be parallel for any orientation of the prism. Thus, prism 37 is only sensitive to a rotation about an axis 47 perpendicular to its apex line 49 i.e. so that reflections from both faces are at angles of 45°. Prism 39 is only sensitive to the three translational degrees of freedom one of which is motion along axis 47, the motion needed for path change. The other 2°, i. e., translation parallel to axis 30 or perpendicular to axis 30 along axis 49 may be used for displacement of the optical axis as will be described below. In other words although the exit ray will be parallel to the incident ray, it will not exit at the desired position unless the two later translational degrees are properly controlled. Thus as long as these 3° are controlled along with the 1° of prism 37 no unwanted shift or misalignment will occur. As shown in the figure, for the image to exit on axis 30, the apex 51 of prism 39 must be aligned with the right angle apex 59 to prism 37. The result when this relationship is changed is shown on FIG. 4. Prism 39 is shifted to the left of prism 37 parallel to axis 30. The result is that the output axis 53 is shifted down from axis 30. In similar manner the axis may be shifted in or out by moving prism 39 in or out with respect to prism 37. If the path is being shifted to realign a viewing axis as in FIG. 1 then the total device comprising prisms 37 and 49 may 39 rolled about axis 30 to FIG. 4 and the axis shift dynamically controlled to keep the output axis 53 aligned resulting in the equivalent of rotation about axis 21 of FIG. 1.

Figure 4A:
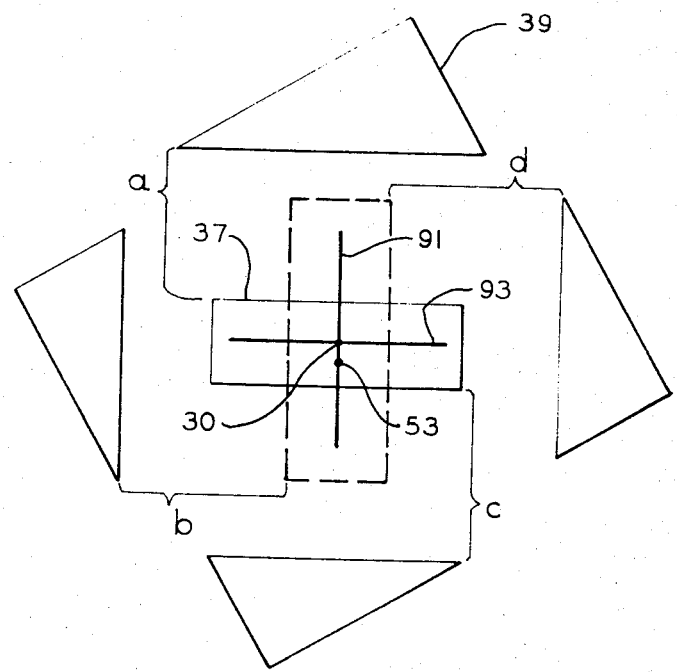
FIG. 4a is a view along the optical axis showing the type of positioning needed when rolling with a displaced axis.

This may be more clearly seen by reference to FIG. 4a. Four positions of prisms 37 and 39 as they rotate about axis 30 as viewed along the axis are shown. The pairings for the four positions are designated by brackets lettered "a" through "d". The "a" combination represents a side view of the arrangement in FIG. 4. Each of the others represent successive 90° rotations counterclockwise about axis 30. Thus for "a" the axis must be shifted down, for "b" to the left, for "c" up and for "d" to the right.

Prism 39 is mounted for motion parallel to and perpendicular to the axis 30 to obtain these shifts as will be described below. If the rotation angle is designated as Θ with a zero Θ at position "a" and motion parallel to the axis 30 (i. e., the type shown on FIG. 4) as X and motion perpendicular to the axis 30 (i. e., in and out of the paper on FIG. 4) as Y, then the required drive signals to position X and Y will be as follows:

$$X = K \cos \Theta$$
$$Y = - K \sin \Theta$$

Where K = the amount of the axis displacement required and positive Θ is counterclockwise.

Means for mounting and positioning the prisms is shown in FIG. 5. An inner cylinder 61 is supported inside an outer cylinder 63 by suitable bearing means for rotation therein. Conventional servo drive means and gearing may be provided to selectively position inner cylinder 61 to control image roll. Mounted to cylinder 61 and radially aligned is a cylinder 65. Slidably mounted inside cylinder 65 is a cylinder 67 which has attached to its end mounting means for prism 39. A portion of cylinder 67 is provided with a rack gear 69 which is driven by a pinion 71 on the end of a servo motor 73. A conventional servo system may be used to drive motor 73 to position cylinder 67 and thus control path length.

The mounting means for prism 39 comprise an X – Y table 75. The X and Y servo motors 77 drive gears 78 to position the table in a manner well known in the art. A conventional servo system may be used to drive motors 77. Prism 39 may be glued or otherwise attached to a block 79 which is mounted for movement by the table 75. The X – Y table will move prism 39 parallel and perpendicular to the optical axis as described in connection with FIG. 4 and thus control the optical axis displacement.

Prism 37 is held by two rectangular mounting fixtures 81 affixed to opposite sides of cylinder 61 and centered on a diameter perpendicular to the radial of cylinder 65. By adjusting the four pairs of screws 83 mounted on the two rectangles 81, prism 37 may be properly aligned to cause the input axis 30 to be on the center of rotation of cylinder 61 and to maintain its proper position in the one degree of freedom to which it is sensitive.

Thus motion of cylinder 67 in and out may be used to compensate for changes in the placement of image plane 17 keeping the distance from lens 25 to image plane 17 constant and causing the final image plane 27 to remain fixed. Rotation of cylinder 61 within cylinder 63 will introduce, along with the shift provided by X – Y table 75, image roll about a displaced axis.

In some applications it may be desired to have controllable X and Y motion at the output with or without roll. An example would be a simulated scanning telescope such as those used in spacecraft simulators. In that case the K in the equations given in connection with FIG. 4a would not be constant as was previously assumed. Referring again to FIG. 4a there are shown two axes 91 and 93. Displacement along axis 91 may be designated M (the K above would then be a M) and along axis 93 as N. With no roll introduced the X and Y above would be described simply as:

$$X = M$$
$$Y = N$$

If roll of the image before displacement is required, transformation is needed resulting in a general equation as follows:

$$X = M \cos \Theta + N \sin \Theta$$
$$Y = N \cos \Theta - M \sin \Theta$$

It can be seen that with N equal to zero and M = K these equations reduce to the ones given above.

Figure 6:
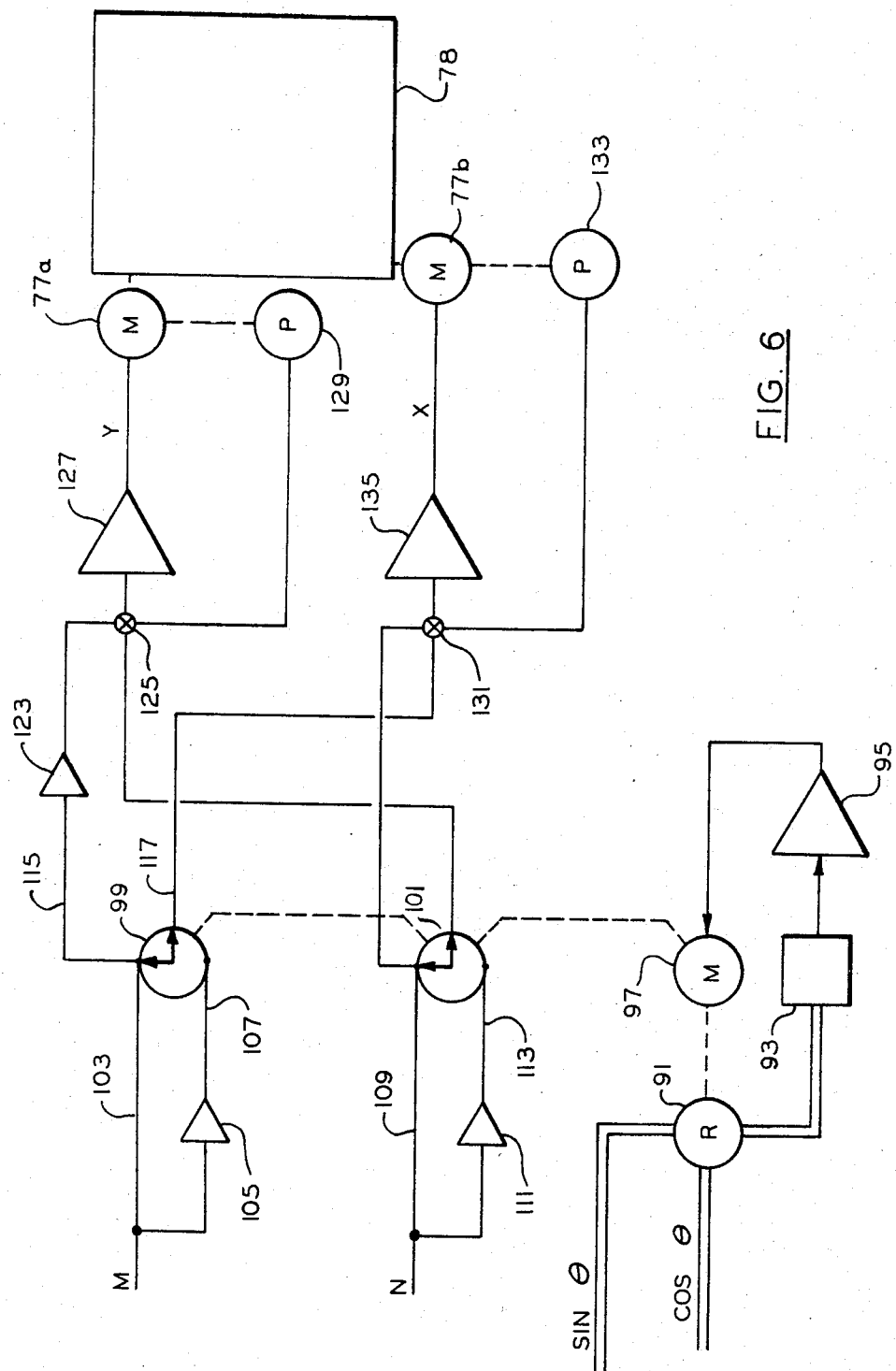
FIG. 6 is a block diagram of a servo-resolver system useful in driving the X – Y table of FIG. 5.

FIG. 6 illustrates thP type of servo system which may be used to drive X – Y table 78. An AC servo system comprising resolver 91, demodulator 93, amplifier 95, and motor 97 is used to establish a shaft position of Θ from sin Θ and cos Θ signals provided to the stator of resolver 91. If the resolver is not at the angle Θ an error results which is demodulated in demodulator 93 and amplified by amplifier 95 causing motor 97 which is mechanically connected to resolver 91 to drive to null out the Θ error.

Also mechanically connected to motor 97 are two sine-cosine potentiometers 99 and 101. Potentiometer 99 has as inputs M on line 103 and minus M Obtained by inverting M through inverter 105 on line 107. In like manner potentiometer 101 is provided with N on line 109 and minus N through inverter 111 on line 113. Each potentiometer has a sine and a cosine output. Thus on line 115 potentiometer 99 provides M sine $\Theta$ and on line 117 M cosine $\Theta$. Likewise potentiometer 101 provides N sine $\Theta$ on line 119 and N cosine $\Theta$ on line 121. The output on line 115 is inverted through inverter 123 to obtain $-$ M sine $\Theta$ and then summed with N cosine $\Theta$ at junction 125 to result in N cosine $\Theta$ $-$ M sine $\Theta$, the value of Y given above. This sum is provided to amplifier 127 which drives the Y motor 77a of X $-$ Y table 78. Connected to the motor is a follow potentiometer 129 whose output is fed back to junction 125 to null out the input when the proper position is reached. In like manner the M cosine $\Theta$ output on line 117 and the N sine $\Theta$ output on line 121 are summed at junction 131 along with the output of follow potentiometer 133 connected to the X motor 77b which is driven by amplifier 135 to which junction 131 provides its input. The sine $\Theta$, cosine $\Theta$, M, and N signals are provided by computer 28 of FIG. 1 in a manner well known in the art.

Thus a simple, relatively insensitive optical device which will provide a path length change for conjugate compensation, image roll, and displacement of an optical axis has been shown. Although the use of the device in an optical probe and scanning telescope have been described it will be evident that other uses are possible. It will be equally evident that various other mounting schemes may be used without departing from the principles of the invention which is intended to be solely limited by the appended claims.

What is claimed is:

1. In an optical system comprising at least means to develop an image at a first image plane and means to image that image at a second image plane parallel thereto and having a first optical axis passing through said first image plane and a second optical axis passing through said second image plane means to divert the optical path between said first and second image planes comprising:
   a. a silvered right angle prism mounted so that one of its short sides intersects the first optical axis with the hypotenuse of the prism substantially parallel to the first optical axis and a plane biSecting the right angle of said prism perpendicular to said axis;
   b. a corner cube prism disposed on the right angle apex side of said right angle prism with its base substantially parallel to and at a distance $x$ from the hypotenuse side of said right angle prism and placed to intersect a ray reflected from said one short side and after internally reflecting said ray to direct it to the other short side where it will be reflected along the second axis.

2. The invention according to claim 1 and further including means to selectively change said distance X whereby the path length may be changed.

3. The invention according to claim 1 and further including means to rotate said right angle prism and said corner cube prism about one of said first and second optical axes while maintaining their relative relationship to one another.

4. The invention according to claim 1 wherein the apex of said corner cube prism lies in said bisecting plane whereby said first and second axes will coincide.

5. The invention according to claim 1 and further including means to selectively move said corner cube prism parallel to said optical axes whereby said second optical axis may be selectively displaced in a first direction with respect to said first optical axis.

6. The invention according to claim 1 and further including means to selectively move said corner cube prism perpendicular to said second optical axis whereby said optical axis may be displaced in a second direction with respect to said first optical axis.

7. The invention according to claim 6 and further including:
   a. means to selectively move said corner cube prism parallel to said optical axes whereby said second optical axis may be displaced in said first direction;
   b. means to rotate said right angle prism and said corner cube prism about one of said optical axes; and
   c. means controlling said parallel and perpendicular moving means to cause said first and second optical axis to remain in fixed positions as said prisms are rotated.

8. The invention according to claim 7 and further including means to selectively change said distance $x$.

9. The invention according to claim 8 wherein said prisms are mounted inside a first cylinder mounted for rotation inside a second cylinder to obtain said rotation, said right angle prism being mounted on a diameter of said first cylinder and said corner cube prism being mounted in an X $-$ Y table fixed to the end of a third cylinder adapted for movement inside a fourth cylinder extending from said first cylinder on a radial perpendicular to said diameter whereby movement of said third cylinder will provide changes in said distance $x$ and the movement of said X $-$ Y table will provide movement parallel and perpendicular to said optical axis.

* * * * *